Dec. 12, 1950 P. A. NOXON Re. 23,303

LINE OF SIGHT STABILIZATION

Original Filed March 14, 1945

INVENTOR
Paul A. Noxon.

BY
J. Talman
ATTORNEY

Reissued Dec. 12, 1950 Re. 23,303

UNITED STATES PATENT OFFICE 23,303

LINE OF SIGHT STABILIZATION

Paul A. Noxon, Tenafly, N. J., assignor to Bendix Aviation Corporation, Teterboro, N. J., a corporation of Delaware Original No. 2,513,738, dated July 4, 1950, Serial No. 582,774, March 14, 1945. Application for reissue September 29, 1950, Serial No. 187,631

18 Claims. (Cl. 318—19)

Figure 1:
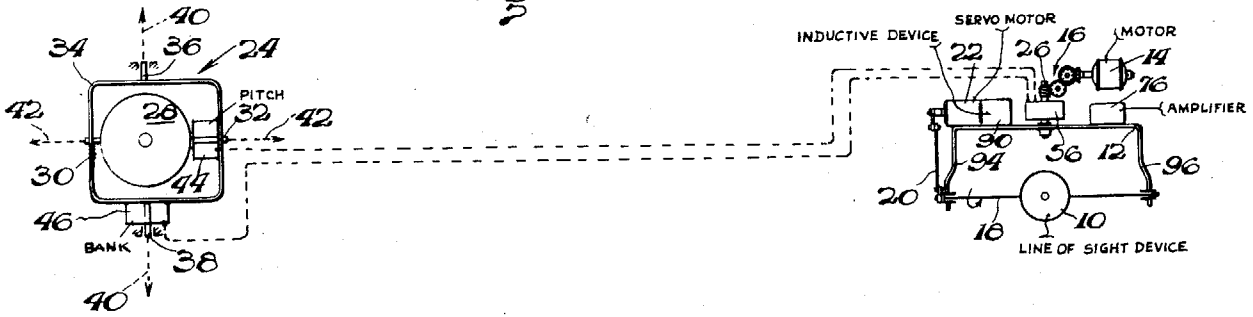

Matter enclosed in heavy brackets [ ] appears in the original patent but forms no part of this reissue specification; matter printed in italics indicates the additions made by reissue

This invention relates to a method and means for stabilizing a line of sight, and more particularly to an arrangement for the stabilzation of mechanism such as radar antennae, telescopes and other scanning or sighting devices against rolling and pitching motions when such devices are mounted on moving vehicles, such as air or water craft for example.

In stabilizing line of sight devices of the foregoing character, it has been previously proposed to employ a gyroscope having suitable mechanism associated therewith for transmitting pitch and bank motions of the craft, to independent servomotor systems. In such an arrangement, the mechanism to be stabilized may be mounted in a convenient gimbal suspension and the two servomotor systems are associated with the gimbal suspension for maintaining the device in a horizontal plane. This construction is bulky, heavy and expensive, due to the fact that two separate and distinct servo systems are required. Moreover, because a considerable mass is necessary to be stabilized, it will be obvious that a large amount of power from the servo systems is needed in order to achieve the desired results.

Another type of stabilizing system has also been proposed heretofore wherein a gyroscope is employed in combination with a single servo system. This arrangement, known as the line of sight method, includes a device associated with a single axis of the gyroscope for energizing the servo system, and requires that the gyroscope be mounted on the mechanism to be stabilized, the latter and the gyroscope being rotated in azimuth. The disadvantage of such a system is that the mounting of the gyroscope so that its gimbal system revolves or oscillates in azimuth, results in the development of acceleration forces which, under certain conditions, cause precession of the gyroscope. Thus, errors will be introduced into the system and the mechanism will not be properly stabilized.

One of the objects of the present invention is to provide a novel method and means for effecting stabilization of a scanning or line of sight device which is so constituted as to avoid the disadvantages inherent in the systems heretofore utilized.

Another object of the invention is to provide a novel stabilizing arrangement including a gyroscope which is remotely located with respect to the mechanism to be stabilized, thus avoiding any tendency toward the introduction of errors into the system by reason of acceleration forces.

Still another object comprehends the utilization of a single servo system in apparatus of the foregoing character, thus achieving a relatively simple structure which will be light in weight and of low cost.

A further object resides in providing a novel stabilizing system employing a gyroscope and a single servo system, wherein provision is made for energizing the latter in accordance with pitch and bank movements of the craft, the arrangement being such that the servomotor is responsive to combined pitch and bank motions.

A still further object is to provide a novel arrangement for stabilizing a line of sight device which is rotatable in azimuth, including a remotely positioned gyroscope having electrical take-offs associated with the pitch and bank axes thereof, the signals generated by pitch and bank motions of the craft being combined and conducted to the servomotor in a novel manner, so that the latter effects an efficient stabilization of the controlled device during rotation thereof.

Still another object comprehends a novel construction wherein the device is efficiently stabilized or controlled so that a horizontal line of sight is maintained regardless of whether the device is rotated or oscillated for scanning or sighting purposes.

Other objects and features of novelty of the invention will appear more fully hereinafter from the following detailed description when taken in connection with accompanying drawing wherein one form of the invention is illustrated. It is to be expressly understood, however, that the drawing is utilized for purposes of illustration only and is not designed as a definition of the limits of the invention, reference being had for this purpose to the appended claims.

Figure 2:
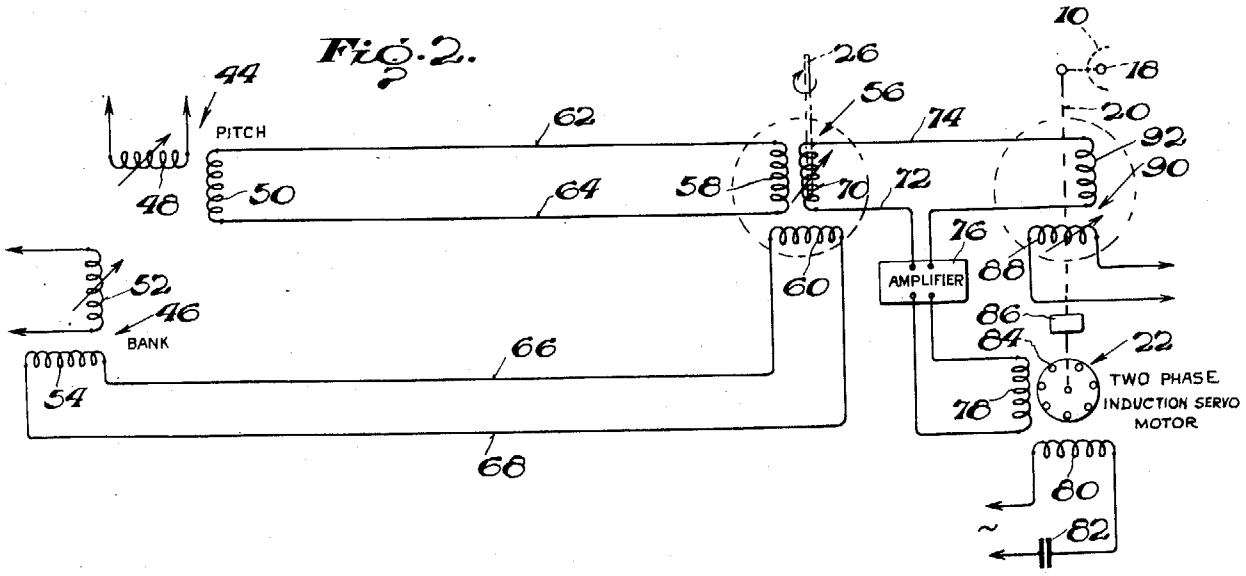

In the drawing wherein similar reference characters refer to like parts throughout the several views;

Fig. 1 is a diagrammatic view of a line of sight stabilizing mechanism embodying the present invention, and Fig. 2 is a wiring diagram illustrating the manner of electrically connecting the various component elements of Fig. 1.

Referring more particularly to Fig. 1, the novel line of sight stabilization mechanism of the present invention is illustrated therein as including a device 10 to be stabilized, carried by a platform or support 12 which is adapted to be rotated by any suitable means such as a motor 14 through reduction gearing 16. As shown, the device 10, is mounted upon a shaft 18 which, through link connections 20, is adapted to be oscillated by means including a servomotor 22, in a manner which will appear more fully hereinafter, in order to maintain the line of sight of device 10 in a horizontal plane as the latter rotates with the platform 12. Control mechanism including a remotely positioned gyroscope 24 is provided for effecting the aforementioned stabilization of the device 10 in a manner to be later described.

In utilizing the present invention on an airplane, for example, and assuming for purposes of description that device 10 takes the form of a radar antenna, the platform 12 and parts supported thereby and including the device 10, are preferably suspended beneath the airplane body so that as the platform 12 is rotated, as by means of motor 14 within the body, and shaft 26 connecting the motor and platform, the device 10 will scan the horizon during normal level flight. If, however, the airplane pitches about its transverse axis or banks about its longitudinal axis, the device 10 no longer rotates in azimuth. The essence of the present invention therefore resides in the provision of a novel arrangement for so moving the shaft 18 and device 10, that the line of sight of the latter rotates in azimuth irrespective of pitching or banking motions of the airplane.

In order to effect the above-mentioned control, the gyroscope 24 may be of the artificial horizon or gyro vertical type and comprises a casing 28 having a rapidly spinning member therein and arranged to spin about an axis which is vertically disposed with respect to the airplane. The casing 28 is provided with oppositely directed trunnions 30 and 32 which are pivotally mounted in a gimbal ring or support 34, the latter having diametrically opposed trunnions 36 and 38, at right angles to trunnions 30 and 32, pivotally mounted in bearings secured to a stationary part of the airplane. For purposes of description it is assumed that the direction of flight is in the direction of the arrow 40, 40, this line also representing the axis of bank of the craft. On the other hand, line 42, 42 is representative of the axis of pitch of the airplane.

Means are provided for deriving signals from the gyroscope 24 in response to pitch and bank movements of the airplane and such means are so constituted that the derived signals are represented by voltages, the values of which are dependent upon the angle of pitch or bank with respect to a horizontal plane. As shown such means comprise take-offs in the form of variable inductive devices 44 and 46, the former comprising wound rotor and stator elements 48 and 50, while the latter includes wound rotor and stator members 52 and 54, respectively. Inductive device 44, hereinafter referred to as the pitch take-off is shown as being associaed with the pitch azis 42, 42 of the gyroscope and is so arranged that the rotor winding 48 is mounted on trunnion 32 while the stator winding is carried by the gimbal ring 34. On the other hand, the inductive device 46, which will be referred to hereinafter as the bank take-off, has its rotor 52 mounted upon the trunnion 38 while the stator is carried by a stationary part. In the case of both take-offs, the respective windings are so arranged that during level flight, no voltage will be generated in the stator windings 50 and 54. However, during motion of the craft about its pitch axis, relative movement between the windings 48 and 50 will take place and a signal voltage proportional to the angle of pitch will be induced in the stator winding 50. Also, in the event of a bank, relative movement between the windings 52 and 54 will cause a voltage to be induced in the winding 54 which will be proportional in value to the angle of bank. It will be understood that a combined pitch and bank will be likewise reflected as induced signal voltages in the stator coils 50 and 54 of the respective take-offs 44 and 46, and here again the magnitude of such signals will be proportional to the bank and pitch angles with reference to a horizontal plane. It is pointed out that the gyroscope 24 and take-offs 44 and 46 associated therewith are remotely positioned with respect to the platform 12 and mechanism to be stabilized, and preferably located within the pilot's compartment.

Novel means are provided by the present invention for transmitting the pitch and bank signal components derived from the gyroscope 24 through the pitch and bank take-offs 44 and 46 respectively, to the servomotor 22, in order that the latter may be effective to control the operation of the antenna device 10 to achieve stabilization thereof in azimuth, irrespective of pitch and roll of the airplane. As shown such means include a variable inductive coupling device 56 having a pair of separate stator windings 58 and 60 which are respectively connected with the take-offs 44 and 46 as by means of connections 62, 64 and 66, 68. The stator windings 58 and 60 are fixedly mounted with respect to the rotatable platform 12 and are adapted to cooperate with a rotor winding 70, connected with the shaft 26, the arrangement being such that when the magnetic coupling between the rotor 70 and stator 58 is a maximum, the coupling between the rotor and stator winding 60 will be a minimum and vice versa. The rotor winding 70 is connected through leads 72 and 74 with the input of an amplifier 76, of any suitable type, and the output of the latter is connected with one of the field windings 78 of the servo motor 22, which in the form shown, may be a two-phase induction motor having its other or fixed field winding 80 connected to a source of alternating current supply through a phasing condenser 82. Rotor 84 is connected through a suitable motion reduction mechanism 86 with the rotor winding 88 of a variable follow-back inductive device 90, the latter being provided with a stator winding 92 connected in series with the rotor winding 70 and the input of the amplifier 76.

In assembling the mechanism heretofore described, the shaft 18 carrying the antenna or other device 10, is suitably rotatably mounted in brackets 94, 96 carried by and rotating with the platform 12, while amplifier 76, servo motor 22, inductive device 90 and rotor winding 70 of the coupling device 56 are supported by the platform or connected with shaft 26, as shown, in order that these elements may rotate with the platform during scanning movement of the device 10. It will be understood that the rotor windings 48 and 52 of the pitch and bank take-offs and rotor winding 88 of the inductive device 90 are connected to the same source of alternating current as the field winding 80 of the servo motor 22. Moreover, rotor 84 of the servo motor 22 is connected through the link mechanism 20 in order to move the shaft 18 and device 10 in response to pitch and bank signals derived from corresponding motions of the airplane.

With the airplane, on which the present invention is mounted, flying in normal level flight in the direction of the arrow 40, Fig. 1, it is also pointed out that the relationship between the device 10 and rotor winding 70 is such that with the line of sight of the device 10 coincident with the direction of flight, the coupling between the rotor winding 70 and the stator winding 58 is at a maximum while the coupling between the rotor and stator winding 60 is at a minimum. It will be understood that these conditions will be reversed when the rotor winding 70 and device 10 are rotated one-quarter of a revolution. In the latter situation, the line of sight of the device 10 will be directed at right angles to the longitudinal axis of the airplane.

In operation, and with the parts arranged as above set forth, as long as the airplane is proceeding in level flight, the platform 12, and parts connected therewith will be slowly rotated by the motor 14 at a relatively slow, uniform speed and the antenna or other line of sight device 10 will scan the horizon. In the event, however, the airplane pitches about its pitch axis 42, 42, it will be obvious that the scanning plane of the device 10 would no longer be horizontal. When such a pitch condition occurs, however, and assuming that the line of sight of device 10 is positioned fore and aft at the moment, a pitch signal will be derived from the pitch take-off 44 which is transmitted to the field winding 78 of the servomotor through amplifier 76 and coupling device 56, it being recalled that the rotor 70 and stator 58 have maximum coupling at the time. In response to the energization of the field winding 78 by the pitch signal, motor 22 will begin rotation and will displace angularly the shaft 18 through link 20 causing compensating or stabilizing movement of the device 10 through shaft 18 and link mechanism 20. Since the pitch signal developed by the pitch condition will be proportional in magnitude to the angle of pitch, the device 10 will be moved through the same angle. As the rotor winding 88 moves, in response to operation of the motor 22, a signal voltage will be induced in the stator winding 92 of inductive device 90, which eventually becomes equal and opposite to the pitch signal induced in the rotor winding 70. When this condition is reached, no further energy is supplied to the field winding 78 and the motor stops, it being pointed out, however, that both the aforementioned signals are present in the rotor winding 70 and the circuit including the input of the amplifier 76 and rotor winding 92. Thus, the function of the inductive device 90 is to secure a follow-back connection to the input of the servomotor 22 in order to control its energization in response to movement thereof.

It will be further understood that as the platform 12 continues rotation, under the above conditions, the coupling between the rotor and stator windings 70 and 58 of the coupling device 56 decreases, in which event the pitch signal diminishes and the signal from the device 90 predominates, thus reversing the operation of the servomotor 22 and causing the device 10 to be moved in the opposite direction to a degree equal to the initial compensating movement of the device. Here again, compensating movement of the device 10 is arrested when the signal voltages in the rotor winding 70 are equal and opposite, and upon continued rotation of the platform 12, the pitch signal will again predominate, in response to the increase in coupling between windings 58 and 70 whereupon the device 10 will be oppositely displaced as the servomotor reverses its direction of rotation. Thus, the path described by the line of sight of the device 10, with respect to the airplane is a sine wave, but with respect to the ground such path will be a horizontal plane and the line of sight will hence be stabilized to rotate in azimuth.

In considering the aforementioned operation in response to pitch of the airplane, it will be appreciated that no signal is present in the stator winding 60 since during pitch conditions there is no relative movement between the rotor and stator windings of the bank take-off 46 to induce a bank signal.

In the event that the airplane banks about the axis 40, 40, with the parts as arranged on the drawing, it is apparent that while a bank signal will be induced in the stator winding 60, due to the relative movement between windings 52 and 54 of the take-off 46, still no signal voltage will be induced in the rotor winding 70 of the coupling device 56. This will be readily understood when it is considered that the line of sight of the device 10 is at the moment, aligned fore and aft, and a bank is, in effect, a movement about the line of sight and no stabilizing or corrective movement is required. However, should the line of sight of the device 10 be athwartship, the coupling between the stator and rotor windings 60 and 70 will be a maximum and the operation of the motor 22, inductive device 90 and device 10 will be precisely the same as that heretofore described in connection with the pitch condition, the only difference being that the signal voltage is derived from stator winding 60 instead of stator winding 58.

It will be understood that should the airplane be subjected to simultaneous pitch and bank conditions, the operation of the system will be as described above, the only difference being that the pitch and bank signals present in the stator windings 58 and 60 will be combined algebraically in the rotor winding 70, and the resultant signal will control the operation of the servomotor 22 and the corrective movement of the device 10.

From the foregoing it will be readily perceived that the present invention provides a component method and apparatus for stabilizing or correcting a line of sight device which is mounted upon an unstable vehicle, the arrangement being such that corrective factors are introduced into the system upon movement of the vehicle about right-angularly related axes, such factors being combined in such a manner that the line of sight is stabilized for scanning or movement in a horizontal plane. Through the use of the novel system disclosed a single servomotor only is required and hence a great saving in expense and weight is secured, which renders the construction highly desirable for use on aircraft. It will be moreover appreciated, that the system lends itself to considerable flexibility in installation, since the rotatable platform may be mounted either beneath the vehicle or above the same, according to the requirements of use. Also, the invention provides a remotely positioned gyroscope which may be conveniently located at any suitable place so that it will not be subjected to undesirable acceleration forces of the rotatable platform, which would otherwise introduce errors in the corrective or stabilizing actions.

While in the foregoing, reference has been made to a radar antenna as comprising the device to be stabilized, it is understood that such device may be any apparatus of the type having a line of sight to be stabilized, such as a telescope, range finder, etc. It will be also understood that such device may be rotated in a continuous or intermittent manner, if desired, and may even be of the type which may be oscillated back and forth for sighting only a portion of the horizon. Various other changes may be made in the various component parts of the system and in the particular circuit arrangements shown, as will now appear to those skilled in the art, without departing from the spirit of the invention. Reference will therefore be had to the appended claims for a definition of the limits of the invention.

What is claimed is:

1. In combination with a line of sight device of the type adapted to be mounted upon a vehicle and being movable for scanning, of means for stabilizing said device against pitching and rolling movements of said vehicle for scanning in azimuth comprising a gyro vertical, means connected with said gyro for deriving separate signal voltages in accordance with said pitching and rolling movements, a single servomotor operatively connected with said line of sight device, and means connected to said last-named means and responsive to said signal voltages for developing a control signal as a function of both of said signal voltages to energize said motor.

2. In combination with a line of sight device of the type adapted to be mounted upon a vehicle and being movable for scanning, of means for stabilizing said device against pitching and rolling movements of said vehicle for scanning in azimuth comprising a gyro vertical, means connected with said gyro for deriving separate signal voltages in accordance with said pitching and rolling movements, a single servomotor operatively connected with said line of sight device, means interconnecting said last-named means with said servomotor and responsive to both of said signal voltages for developing a control signal as a function of said two signal voltages to energize said motor and means connected to said interconnecting means and dependent upon the position in azimuth of said line of sight device for modifying the operation of said motor.

3. A stabilizing system as set forth in claim 2 wherein the [interconnected] *interconnecting* means includes a variable inductive device for transmitting a signal voltage to said motor.

4. In a system for stabilizing a movable line of sight device against bank and pitch movements of a vehicle, comprising a reversible motor operatively connected with said device, separate means for deriving signals responsive respectively to bank and pitch movements of said vehicle, means responsive to both of said bank and pitch signals for developing a control signal as a function of said bank and pitch signals [.] and means interconnecting said last-named means and said motor for energizing said motor in accordance with said control signal.

5. In a system for stabilizing a movable line of sight device against bank and pitch movements of a vehicle, comprising a reversible motor operatively connected with said device, an artificial gyroscopic horizon device responsive to said bank and pitch movements, separate means connected with said horizon device for deriving signal voltages responsive respectively to said bank and pitch movements, means responsive to both of said bank and pitch signals for developing a control signal as a function of said bank and pitch signals, and means interconnecting said last-named means and said motor for energizing said motor in accordance with said control signal.

6. Apparatus for stabilizing a line of sight device against bank and pitch movements of a vehicle, comprising means for mounting said device for scanning movement in azimuth, and means for moving said device about an axis at right angles to the axis of the line of sight of said device to maintain the scanning path of the latter in a horizontal plane irrespective of bank and pitch movements of the vehicle, comprising a reversible servomotor operatively connected with said device to move the same in opposite directions about said first named axis, means carried by said vehicle and responsive to bank and pitch movements thereof for developing bank and pitch signals, means connected to said bank and pitch signal developing means for developing a control signal as a function of said bank and pitch signals, means connected to said control signal developing means for modifying said control signal in accordance with the position in azimuth of said device, and means connected with said control *signal* developing means to energize said motor in accordance with the modified signal.

7. Apparatus for stabilizing a line of sight device against bank and pitch movements of a vehicle, comprising means for mounting said device for scanning movement in azimuth, and means for moving said device about an axis at right angles to the axis of the line of sight of said device to maintain the scanning path of the latter in a horizontal plane irrespective of bank and pitch movements of the vehicle, comprising a reversible servomotor operatively connected with said device to move the same in opposite directions about said first named axis, means carried by said vehicle and responsive to bank and pitch movements thereof for developing bank and pitch signals, means connected to said bank and pitch signal developing means for developing a control signal as a function of said bank and pitch [signal] *signals*, means connected to said control signal developing means for modifying said control signal in accordance with the position in azimuth of said device, means connected to said control signal developing means to energize said motor in accordance with the modified signal, and means connected to said control signal developing means and responsive to movement of said motor to reverse the operation thereof.

8. Apparatus for stabilizing a line of sight device against bank and pitch movements of a vehicle, comprising means for mounting said device for scanning movement in azimuth, and means for moving said device about an axis at right angles to the axis of the line of sight of said device to maintain the scanning path of the latter in a horizontal plane irrespective of bank and pitch movements of the vehicle, comprising a reversible servomotor operatively connected with said device to move the same in opposite directions about said first named axis, means carried by said vehicle and responsive to bank and pitch movements thereof for developing bank and pitch signals, means connected to said bank and pitch signal developing means for developing a control signal as a function of said bank and pitch signals, means connected to said control signal developing means for modifying said control signal in accordance with the position in azimuth of said device, and means connected to said control signal developing means and to said motor to derive a follow-back signal in response to rotation of said motor to oppose said control signal.

9. Apparatus for stabilizing a line of sight device against bank and pitch movements of a vehicle, comprising means for mounting said device for scanning movement in azimuth, and means for moving said device about an axis at right angles to the axis of the line of sight of said device to maintain the scanning path of the latter in a horizontal plane irrespective of bank and pitch movements of the vehicle, comprising a reversible servomotor operatively connected with said device to move the same in opposite directions about said first named axis, a gyro vertical adapted to be mounted on the vehicle, separate means connected with the pitch and bank axes of said gyro for deriving pitch and bank signals in accordance with the degree of pitch and bank of the vehicle, and means including a coupling device connected with said separate means for developing a control signal as a function of said pitch and bank signals and for energizing said servomotor with the control signal, said coupling device including coupling-varying means movable synchronously with the line of sight device during scanning movement thereof whereby said control signal is also a function of the movement of said device.

10. Apparatus as defined in claim 9 including means for modifying said control signal in accordance with operation of said motor.

11. Apparatus as defined in claim 9 including a variable inductive device for deriving a signal dependent upon the operation of said motor, and means to combine said last-named signal with said control signal.

12. Apparatus for stabilizing a line of sight device against bank and pitch movements of a vehicle, comprising means for mounting said device for scanning movement in azimuth, and means for moving said device about an axis at right angles to the axis of the line of sight of said device to maintain the scanning path of the latter in a horizontal plane irrespective of bank and pitch movements of the vehicle, comprising a reversible servomotor operatively connected with said device to move the same in opposite directions about said first named axis, a gyro vertical responsive to pitch and bank movements of the vehicle, a first variable inductive means connected with said gyro vertical for deriving a pitch signal voltage proportional to the angle of pitch of the vehicle, a second variable inductive means connected with said gyro vertical for deriving a bank signal voltage proportional to the angle of bank of the vehicle, means connected to both of said inductive means and responsive to both of said pitch and bank signal voltages for developing a control signal as a function of said pitch and bank signal voltages which varies in magnitude synchronously with scanning movement of said line of sight device, and means to energize said servomotor with said control signal.

13. Apparatus as defined in claim 12 including a follow-back circuit connection from said motor to said control signal developing means.

14. Apparatus as defined in claim 12 wherein said control signal developing means includes a pair of non-inductively related wound stator elements respectively connected with said first and second variable inductive means, and a wound rotor element synchronously movable with said line of sight device successively into full inductive relationship with said stator elements.

15. Control mechanism for a line of sight scanning device of the type adapted to be mounted on an aircraft and being rotatable in azimuth, comprising a gyro vertical adapted to respond to pitch and bank movements of the aircraft, a pair of independent take-offs associated with said gyro for separately deriving pitch and bank signal voltages proportional respectively to the angles of pitch and bank, means connected with said take-offs and responsive to the pitch and bank signals thereof for developing a single control signal and means connected to said control signal developing means for oscillating said device in opposite directions about an axis at right angles to the line of sight axis thereof, and during rotation thereof, in accordance with said control signal, whereby the line of sight axis of said device is maintained horizontal irrespective of pitch and bank movements of the aircraft.

16. Apparatus for stabilizing in a predetermined plane a movable scanning device of the type adapted to be mounted upon a mobile vehicle subject to movement relative to said plane, comprising means including a single servomotor for moving said device to maintain it in said plane, and means carried by the vehicle and responsive to movement of the vehicle about a pair of mutually perpendicular axes relative to said plane for energizing said motor.

17. Apparatus for stabilizing in pitch and roll a movable scanning device of the type adapted to be mounted upon a mobile vehicle subject to pitch and roll movement, means comprising a three-degree-of-freedom gyroscope providing signals proportional to the pitch and roll movement of the vehicle, a servomotor for moving said device to stabilize it in pitch and roll, and means responsive to said pitch and roll signals for energizing said motor.

*18. Apparatus for stabilizing in pitch and roll a movable controlled device of the type adapted to be mounted upon a mobile vehicle subject to pitch and roll movement, means comprising a three-degree-of-freedom gyroscope providing signals proportional to the pitch and roll movement of the vehicle, a servomotor for moving said device to stabilize it in pitch and roll, and means responsive to said pitch and roll signals for energizing said motor.*

PAUL A. NOXON.

REFERENCES CITED

The following references are of record in the file of this patent:

UNITED STATES PATENTS

| Number | Name | Date |
|---|---|---|
| 2,433,837 | Dawson | Jan. 6, 1948 |